United States Patent [19]

Beeteson et al.

[11] Patent Number: 5,605,595
[45] Date of Patent: Feb. 25, 1997

[54] FACEPLATE BONDING PROCESS AND APPARATUS THEREFOR

[75] Inventors: John Beeteson, Skelmorlie; Anthony C. Lowe, Braishfield, both of United Kingdom

[73] Assignee: IBM Corporation, Armonk, N.Y.

[21] Appl. No.: 441,711

[22] Filed: May 15, 1995

Related U.S. Application Data

[63] Continuation-in-part of Ser. No. 262,728, Jun. 20, 1994, Pat. No. 5,417,791.

[30] Foreign Application Priority Data

Dec. 18, 1993 [GB] United Kingdom ............... 9325932

[51] Int. Cl.$^6$ ............................................. B32B 17/06
[52] U.S. Cl. ........................... 156/295; 313/478; 348/824
[58] Field of Search .................... 156/295, 107, 156/300, 297; 348/824; 313/478, 479

[56] References Cited

U.S. PATENT DOCUMENTS 3,075,870  1/1963  Hedler et al. .................. 156/295 X

FOREIGN PATENT DOCUMENTS

0255958A2  2/1988  European Pat. Off. .
0434314A2  6/1991  European Pat. Off. .
909333    10/1962  United Kingdom .
WO85/04740 10/1985  WIPO .

Primary Examiner—Michael W. Ball
Assistant Examiner—Sam Chuan Yao
Attorney, Agent, or Firm—Scully, Scott, Murphy & Presser

[57] ABSTRACT

A method of bonding faceplates (20) to VDU screens is provided in which an adhesive material is dispensed (80) onto a surface of either the faceplate or the VDU (40), the faceplate and the VDU are brought together (90) to force the adhesive material outwards to fill the gap between the surfaces, and the adhesive material layer (41) which is formed is then cured. In a first curing step (100), curing is carried out around the edges of the faceplate to form a seal around the edges. This first step may be carried out in a dedicated positioning tool. A later curing step (120) ensures that all of the adhesive material layer is eventually cured. Positioning (90) in the dedicated tool may use specific reference points on the faceplate and the VDU rather than relying on physical spacers, and may be carried out under servo control of a system for detecting the onset of undesirable gas entrapment conditions within the adhesive layer. The invention is particularly useful for automated or semi-automated bonding of touch-plates to screens to form touch-input displays, with the avoidance of spacers and with the selective, two-stage curing enabling minimising of time in the positioning tool.

5 Claims, 11 Drawing Sheets

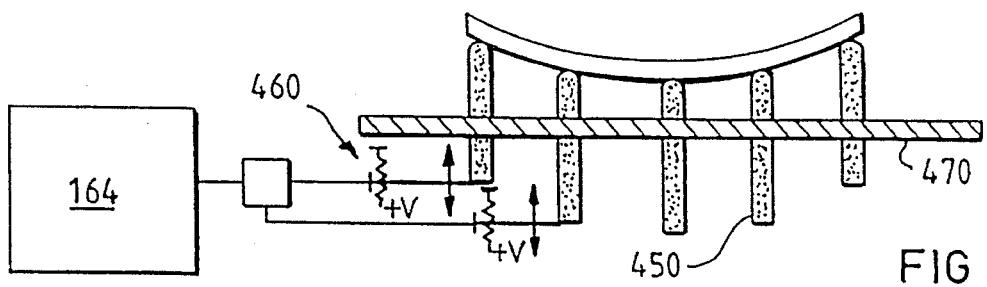
FIG 18a
SIDE VIEW
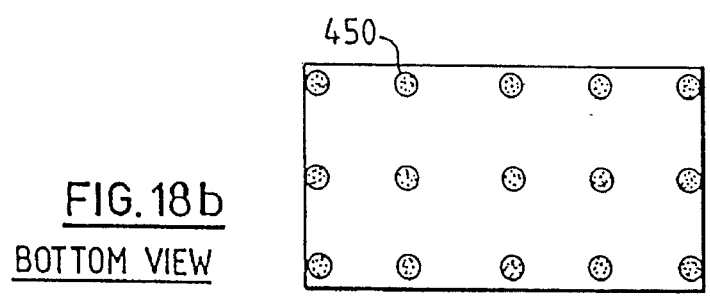
FIG. 18b
BOTTOM VIEW
FIG. 19a
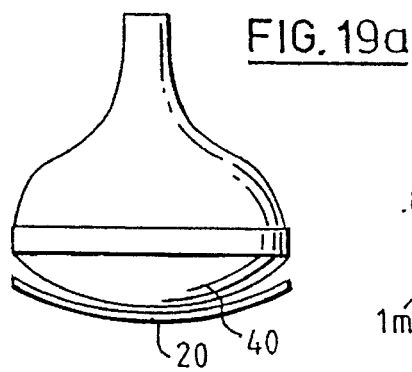
FIG. 19b
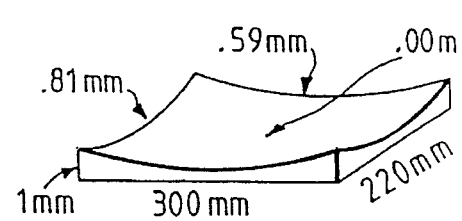
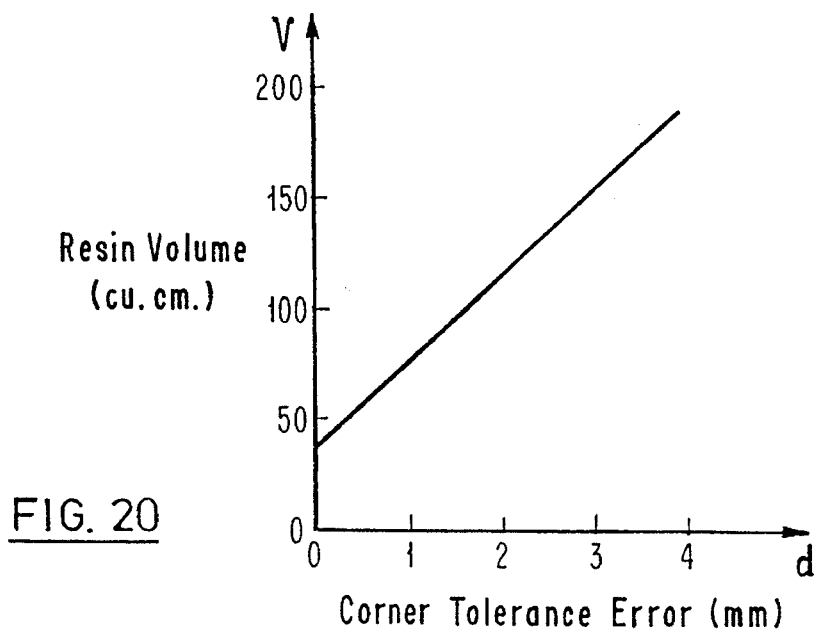
FIG. 20

FACEPLATE BONDING PROCESS AND APPARATUS THEREFOR

This application is a continuation-in-part of application Ser. No. 08/262,728 filed on Jun. 20, 1994, now U.S. Pat. No. 5,417,791.

The present invention relates to a process for bonding a faceplate to the display screen of a visual display unit (VDU) or monitor for a computer system, and in particular to a process for adhering together opposed surfaces of a faceplate and a monitor screen using a transparent adhesive material. The process is particularly useful for bonding a faceplate to an integrated tube component (ITC) of a monitor as a step in the manufacture of a monitor having a touch-input enabled display in which the faceplate has associated touch-stimuli sensors.

A monitor having a touch-sensitive display typically includes a cathode ray tube monitor and a transparent, touch-sensitive overlay which is attached to the face of the monitor. Such displays are usually part of a computer system having a small processor. To enable a touch-sensitive display to be used, computer programs are written for execution in the processor. The computer programs define the response of the computer system whenever the screen is touched at particular points. Depending on the particular program, a screen touch may cause video information to be retrieved from an external video source for display on the screen, either alone or in combination with graphics information generated by the processor. A screen touch may also result in the display of processor-generated graphics information only.

Touch-sensitive displays have been implemented using a number of different technologies for detecting touch stimuli. In one such technology, a transparent overlay is placed over a CRT screen. The overlay contains an array of electromechanical pressure sensors which are generally either resistive, conductive or capacitive in form. The sensors are arranged in rows and columns spanning the CRT screen area. Each sensor therefore corresponds to a particular screen location. A signal from one such sensor is thus indicative of a particular screen location. There is a problem with such sensors in that they tend to partially obscure from view whatever image is displayed on the screen. Furthermore, to limit this obscuring effect, the sensors are generally fabricated on a fragile wafer-like substrate which is easily damaged during assembly or use.

Another technology involves the processing of an optical signal scanned across a CRT screen in order to determine a touch location. In general, this technology has problems associated with optical parallax. Furthermore, detection of the optical signal can be prevented by foreign bodies in the vicinity of the CRT screen.

Another technology involves an array of pressure sensitive transducers mounted around the periphery of a CRT screen. Each transducer generates an electrical signal in response to and representative of a touch stimulus applied to the CRT screen. The relative magnitudes of these signals can be processed to determine the location on the CRT screen at which the stimulus was applied. A problem with such an arrangement is that the transducers are sensitive to spurious vibrations of the display. Furthermore, the pressure-sensitive transducers are exposed to any out-of-balance forces which may be produced within the monitor during assembly. Such undesirable effects can be reduced by locating the array of force transducers around the periphery of a transparent push plate which is shaped to match the contours of, but does not make contact with, the CRT screen. A disadvantage with this arrangement resulting from the touch plate being raised above the CRT screen is that a visually objectionable optical parallax effect is produced. Another disadvantage is that internal reflections can occur between the CRT screen and the touch-plate. Furthermore, this arrangement generally requires mountings for the touch-plate which are resilient enough to withstand repeated touch operations as part of a normal product lifetime, yet not so rigid as to limit movement of the touch-plate relative to the CRT screen.

EP-A-0256251 describes a touch-plate arrangement which is similar to that described above. The touch-sensitive screen assembly comprises a frame with openings to align with mounting brackets extending from a display unit such as a CRT screen. The frame supports a rigid transparent touch-plate facing the display. An array of pressure-sensitive transducers is mounted on the touch-plate surface facing the display. The touch-screen assembly is held in position with deformable members positioned at the connection between the openings on the frame and the brackets on the display unit. The deformable members resist shifting of the touch-plate in a direction parallel to the face of the CRT, yet resistance to movement of the plate towards or away from the CRT is minimised. Thus, measurement repeatability during the normal lifetime of the display apparatus is provided. However, the deformable members are large in relation to conventional CRT mounting screws. In addition, this arrangement can also be sensitive to vibrations of the display and therefore complex electronic signal processing is required for conditioning the signals from the transducers.

EP-A-0434314 describes a touch display which is not over-sensitive to vibrational forces, and which prevents optical problems due to parallax or internal reflections from arising. A rigid transparent faceplate with touch sensitive elements thereon is mounted to the display screen using a transparent, elastic, adhesive compound film which has a similar refractive index to that of the display screen. Since the touch-plate is supported by the adhesive compound and not by the display's touch-sensitive transducers, forces generated during assembly of the display unit do not apply undesirable bias to the transducer array.

Known methods for bonding faceplates onto monitors involve positioning spacers at the edges of the ITC screen, or of the faceplate, offering the faceplate up to the ITC screen, and sealing the edge of the faceplate to the ITC to provide a physically contained volume for the adhesive. The seal may have a plurality of pin-holes around its periphery. The face of the ITC is held vertical, oriented so that an opening in the seal is at the top edge. Epoxy resin, which is mixed and outgassed, is then pumped into the opening. The resin is allowed to run out of the pin-holes while the contained volume is being filled, until the operator determines that the space between the ITC and the faceplate is satisfactorily filled. The pin-holes and the filling opening are then covered and the resin is cured. It is generally necessary to trim excess resin from the edges of the assembly after curing. Example methods of the above type are described in relation to the lamination of a transparent safety panel to a CRT screen in U.S. Pat. No. 4,656,522.

SU-A-1446868 describes a method for bonding an antiglare filter to a CRT in which the filter is positioned horizontally at the bottom of a mould, with transparent spacers set at its corners. Resin is poured over the filter and the CRT is then lowered into the mould to press against the resin. The mould walls provide peripheral containment of the resin.

Required is a more efficient method for bonding faceplates to VDU screens which is in particular suitable for manufacture of touch-sensitive displays having touch-plates adhered to a display screen. It is desired to increase the scope for automation over the existing faceplate bonding processes (which are generally reliant on operator judgement as noted above), and generally to increase the speed and reduce the cost of the process.

Accordingly, it is a first aspect of the present invention to provide a method of attaching a transparent faceplate to a screen of a visual display unit (VDU), by adhesion of opposed surfaces thereof, comprising the steps of:

dispensing a volume of a transparent adhesive material onto at least one of said surfaces;

bringing said surfaces together in a controlled manner to cause the adhesive material to spread across said surfaces towards their edges to fill the gap therebetween;

selectively curing the adhesive material at the edges of the opposed surfaces to secure the faceplate to the screen of the VDU; and subsequently curing the remaining uncured adhesive material.

The selective curing of adhesive around the edges of the opposed surfaces, without necessarily curing all of the adhesive layer at this stage, represents a great reduction in the time required to fix a faceplate to a VDU screen. Forming a permanent cured adhesive seal, which does not allow leakage of adhesive, enables the visual display unit and attached faceplate to be removed from any support tool that holds them for the bonding operation. This may be after a much shorter time period than is possible with the known processes which require the fixing adhesive to be completely cured in a single operation. The present invention thus enables the production tooling to be used for the attachment process of the next monitor (or batch of monitors) after a reduced time period, reducing the overall production cycle time.

Preferably, the step of selectively curing the adhesive at the edges of the opposed surfaces comprises selectively curing the adhesive material at positions around the edges progressively as the advancing adhesive-to-gas interface reaches the edges at each of these positions. Due to the viscosity and surface tension forces of the adhesive materials which are suitable for this bonding (e.g. acrylic and epoxy resins), the advancing adhesive interface tends to form a bead at the edge of the faceplate. Selective curing is then used to cure this bead as it forms to produce a permanent bond between the opposed surfaces. The end-point of the adhesive fill of the gap between the opposed surfaces may be automatically determined if the selective curing is automatically actuated when the adhesive reaches the edges.

The progressive selective curing as the adhesive reaches the edge of the faceplate has the effect of preventing mess and wastage of adhesive material that occurs if the adhesive is allowed to overflow from the edges, and reduces the time required for the bonding process. Since the faceplates and CRT screens are substantially rectangular rather than circular, overflow is to be expected to occur from the mid-regions of the edges of the opposed surfaces before the adhesive reaches the corner regions unless there is either selective curing of the adhesive material as described above or physical containment thereof prior to curing, or the viscosity and surface tension properties of the adhesive material are very carefully selected.

It is preferred that the step of selectively curing the adhesive at the edges of the opposed surfaces is carried out in response to a signal from a visual detection means arranged to detect the approach of the adhesive-to-gas interface to the edge of the opposed surfaces. Alternatively or in combination with the use of a visual detection system, the selective curing may involve masking the adhesive layer, other than a portion of the adhesive layer which is in the region of the edges of the opposed surfaces, from curing irradiation. This irradiation may be ultraviolet electromagnetic radiation.

Alternatively, the adhesive material may be cured rapidly as it reaches the edge of the faceplate by laser or other thermal radiation, or by conductive heating—for example, from a hot roller to which the adhesive does not adhere. Another alternative method of rapidly curing the adhesive material at the edges of the faceplate is to pre-coat the edges of the faceplate and the display screen with a chemical curing agent, which causes local rapid curing once the adhesive material comes into contact with it.

An alternative method, which is more applicable to a lower level of automation than is the detection-responsive curing, is to use the known industry techniques of applying a bead of material—e.g. a fast-setting, non-spreading adhesive material such as CIBA Araldite 2010 to provide a physical barrier to the final adhesive material fill. (CIBA and araldite are trade marks of Ciba-Geigy AG). Small exit tubes or holes are made in the bead for the purpose of filling.

It is preferred that the method according to this aspect of the invention includes the step of locating reference points on the faceplate and on the VDU for precise relative positioning of the opposed surfaces. This step is generally intended to comprise either precisely measuring reference points on the VDU and the faceplate or seating the surfaces to be bonded at precise reference points in automatically-positionable support tools. The located reference points enable the final position of the screen relative to the faceplate to be determined without the need for the positioning of physical spacers between the surfaces to be bonded. Alternatively, positioning of the surfaces may involve placing spacers between the surfaces as is known in the art, but the avoidance of the need to position spacers between the surfaces is desirable to simplify the bonding process. More specifically, the use of spacers is undesirable in touch-sensitive displays, since their necessary rigidity constrains the freedom to provide displays in which the faceplate is physically moved relative to the VDU display screen in response to a touch stimulus. Spacers, even if transparent, may also produce undesirable visible effects.

In a second aspect, the present invention provides a method of attaching a transparent faceplate to a screen of a visual display unit (VDU), by adhesion of opposed surfaces thereof, comprising the steps of:

dispensing a volume of a transparent, adhesive material onto at least one of said surfaces;

bringing said surfaces together under the control of signals from a detection system to cause the adhesive material to spread across said surfaces towards their edges to fill the gap therebetween, the detection system being arranged to detect the onset of entrapment of gas behind the advancing adhesive-to-gas interface and to transmit control signals to avoid such entrapment; and curing the adhesive material to secure the faceplate to the screen.

The avoidance of air bubbles in the adhesive layer between the faceplate and the VDU screen is extremely important because of the undesirability of visible air-adhesive interfaces within this layer and of the visual effects which will arise if the layer separating the faceplate and the VDU screen contains patches which have markedly different refractive indexes. The adhesive material should generally be outgassed prior to the step of dispensing adhesive onto a surface to be adhered, assuming the adhesive material is such as to require such a process.

In a third aspect, the present invention provides a method of attaching a transparent faceplate to a screen of a VDU, by adhesion of opposed surfaces thereof, comprising the steps of:

locating reference points on the faceplates and on the VDU for precise relative positioning of said surfaces;

dispensing an adhesive material onto at least one of said surfaces;

bringing said surfaces together in a controlled manner, the final position of the screen relative to the faceplate being determined with reference to said reference points without the need for the positioning of physical spacers between said surfaces; and curing the adhesive material to secure the faceplate to the screen.

The method of positioning the components which are to be secured together according to reference points located thereon avoids the generally accepted prior art requirement for spacers to be positioned between the surfaces, and thereby provides a means to improve manufacturing throughput over these prior art methods. This is especially useful in view of the desirability of increased automation of manufacture.

In a preferred embodiment, the invention provides a method of attaching a transparent plate to a screen of a visual display unit (VDU) for a computer system, by adhesion of opposed surfaces thereof, which plate is to cooperate with touch sensing means for producing a plurality of electrical signals in response to and representative of a touch stimulus applied to the plate by a user, for provision of a touch-sensitive display, comprising the steps of:

locating reference points on the touchplate and on the VDU for precise relative positioning of said surfaces;

dispensing a volume of an outgassed transparent, elastic, adhesive material onto one or both of said surfaces;

bringing said surfaces together in a controlled manner to cause the adhesive material to spread across said surfaces towards their edges to form an adhesive layer which fills the gap therebetween, the final position of the screen relative to the faceplate being determined with reference to said reference points without the need for the positioning of physical spacers between said surfaces;

selectively curing the adhesive at the edges of the opposed surfaces to form a bead of cured resin which secures the touchplate to the screen of the VDU; and curing the remaining uncured adhesive material.

Embodiments of the invention will now be described in more detail, in order that the invention may be more fully understood, with reference to the accompanying drawings in which.

Figure 11:
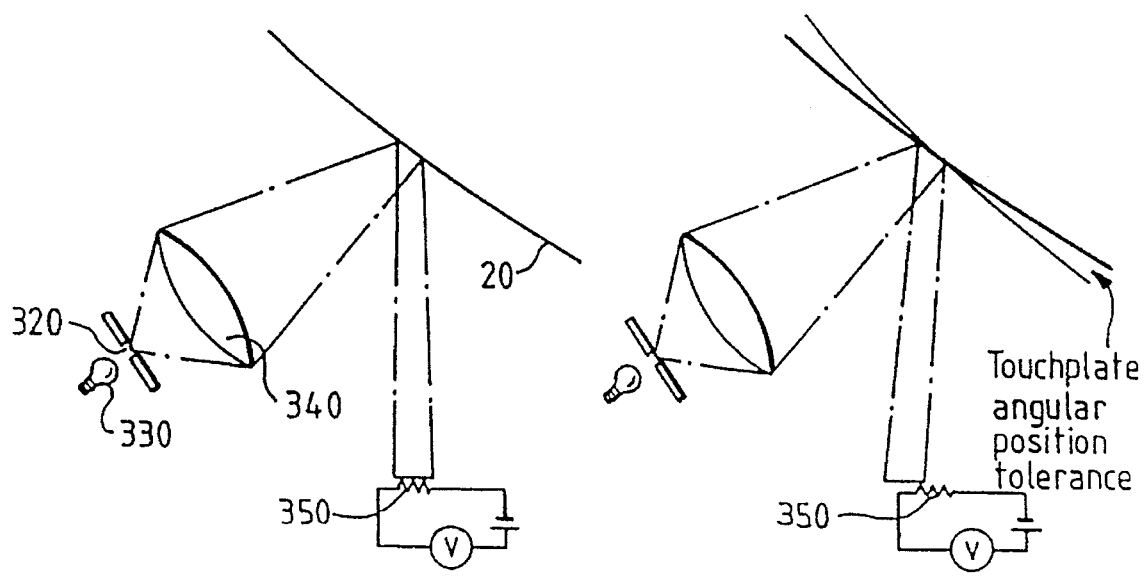
Figure 12:
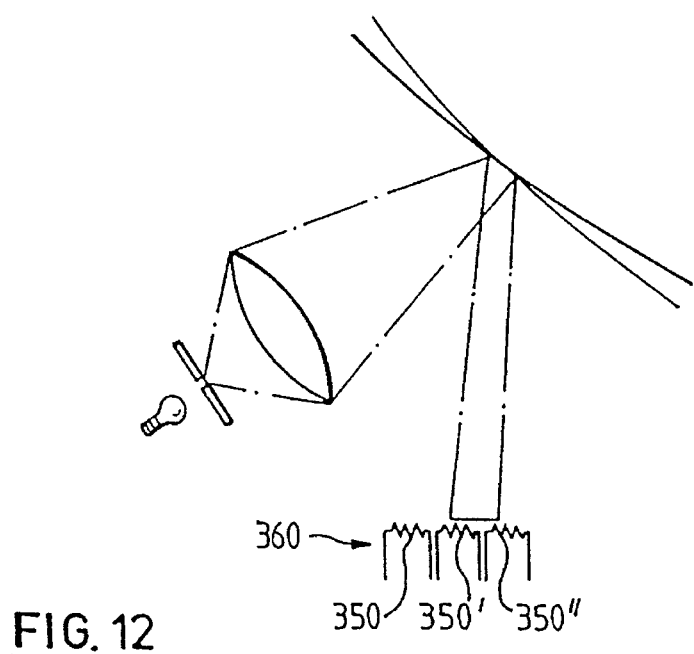
Figure 13:
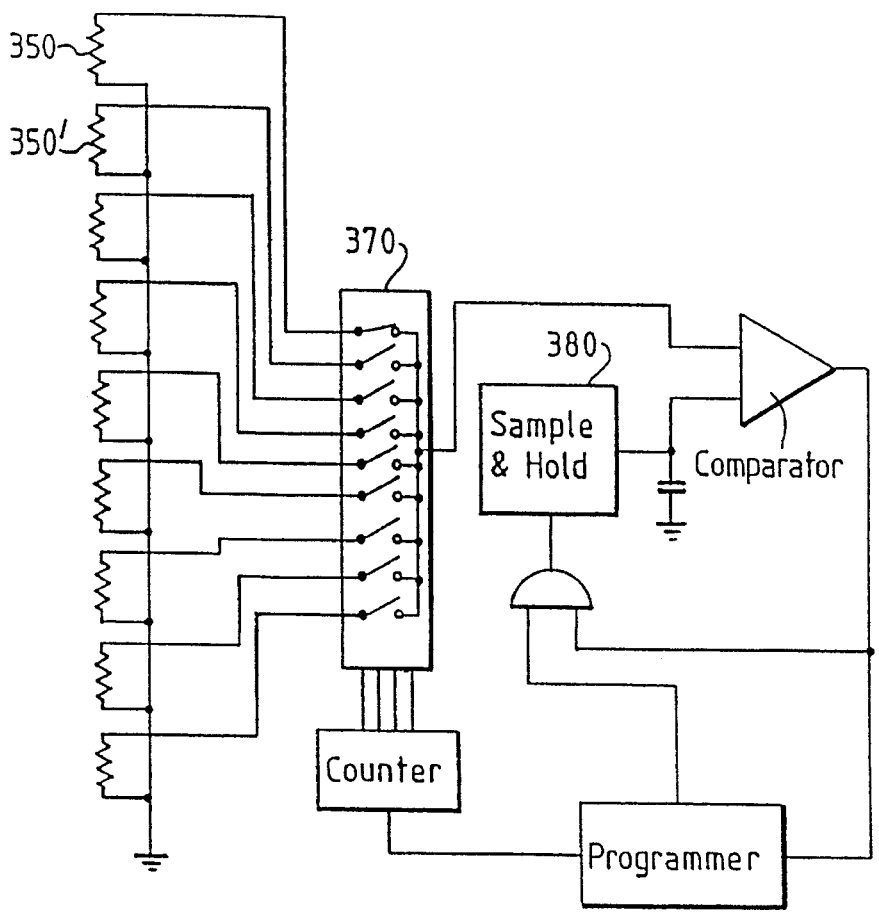
Figure 14:
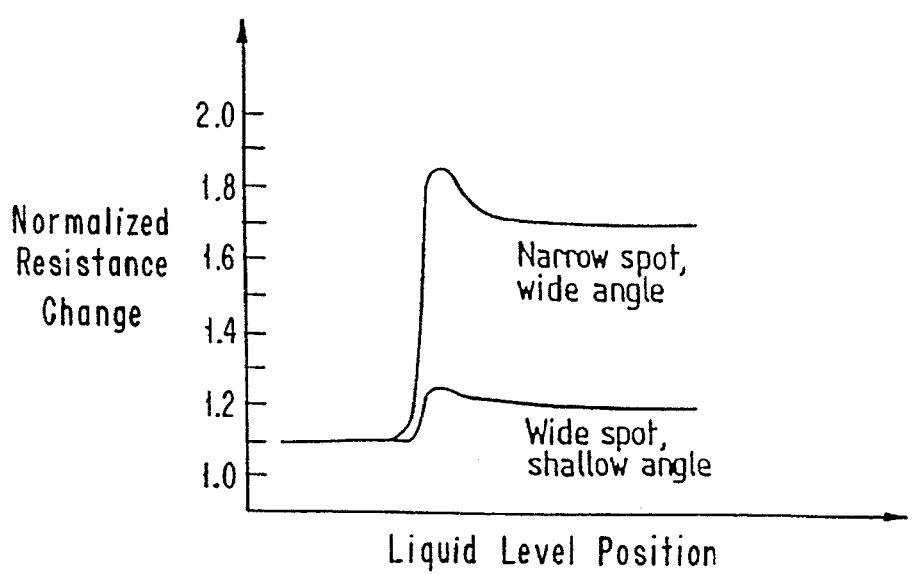
Figure 15A:
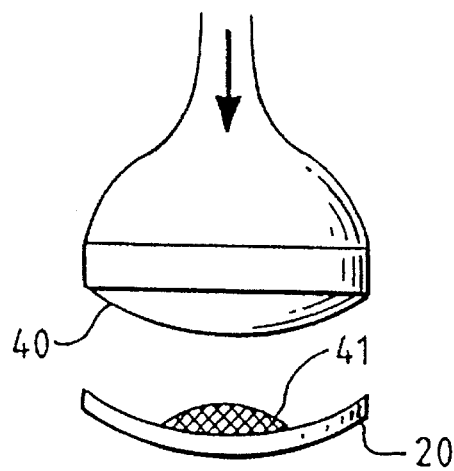
Figure 15B:
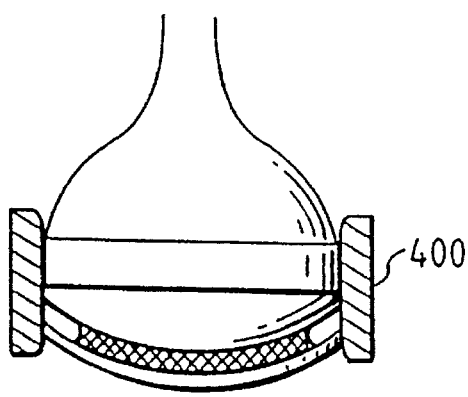
Figure 15C:
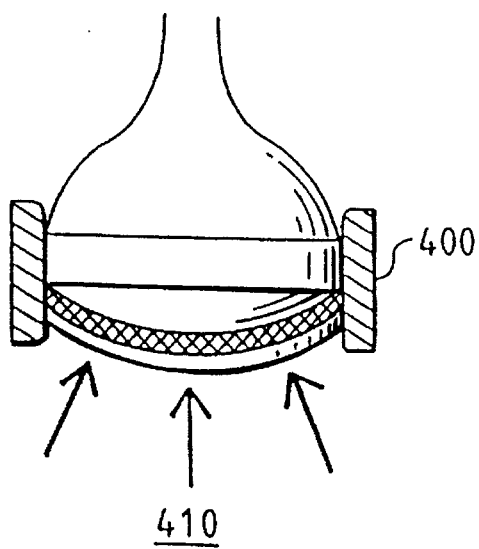
Figure 16:
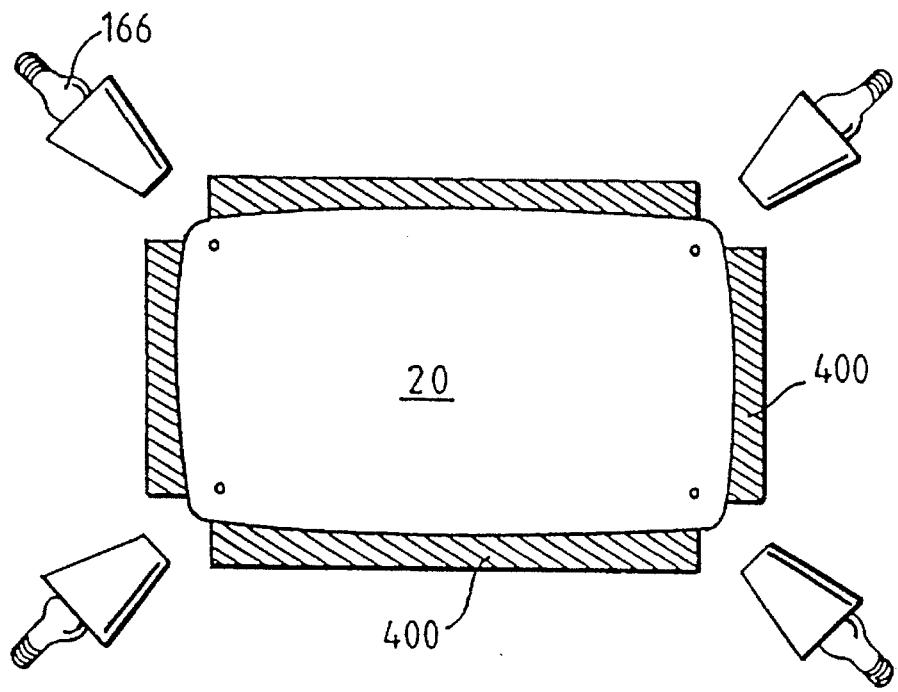
Figure 17:
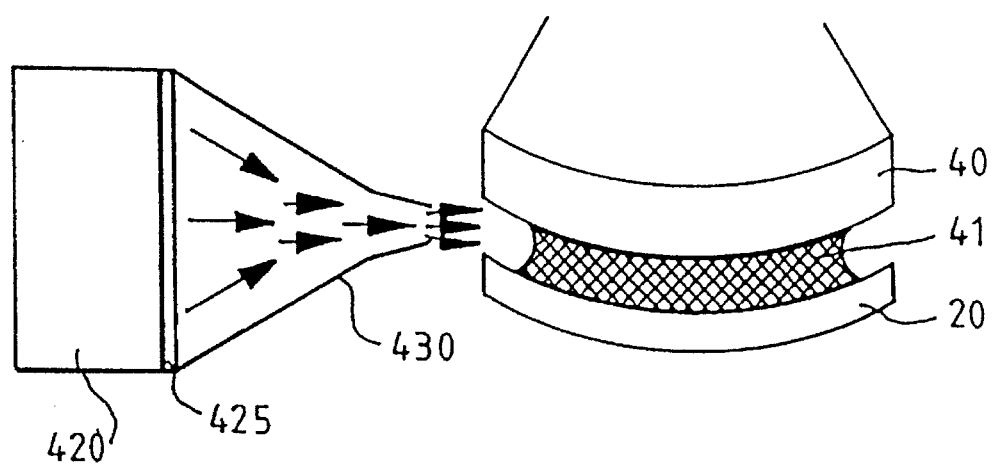

FIG. 11 schematically shows the effect of an angular position error of the faceplate according to an embodiment of the invention;

FIG. 12 is a diagrammatic representation of a resin surface detection system having an array of sensors according to an embodiment of the invention;

FIG. 13 shows a circuit diagram that determines use of a proper sensor from the sensor array of the detection system of FIG. 12 according to an embodiment of the invention;

FIG. 14 is a graph showing detection results using a detection system according to an embodiment of the invention;

FIGS. 15a–15c show three stages of a process for bonding a faceplate to a CRT according to an embodiment of the invention;

FIG. 16 shows physical arrangement of seals in contact with faceplate edges according to an embodiment of the invention:

FIG. 17 shows a fan having a profiled nozzle for directing air onto a resin interface between a faceplate and a CRT according to an embodiment of the invention;

FIGS. 18a–18b show a system for implementing faceplate measurement to calculate resin volume according to an embodiment of the invention;

FIG. 19a–19b show the effect of faceplate radius variations relative to the CRT curvature radius, and a flat plane mapped error volume representation according to an embodiment of the invention; and FIG. 20 is a graph showing the effect of faceplate radius error on the required resin volume according to an embodiment of the invention.

Figure 1:
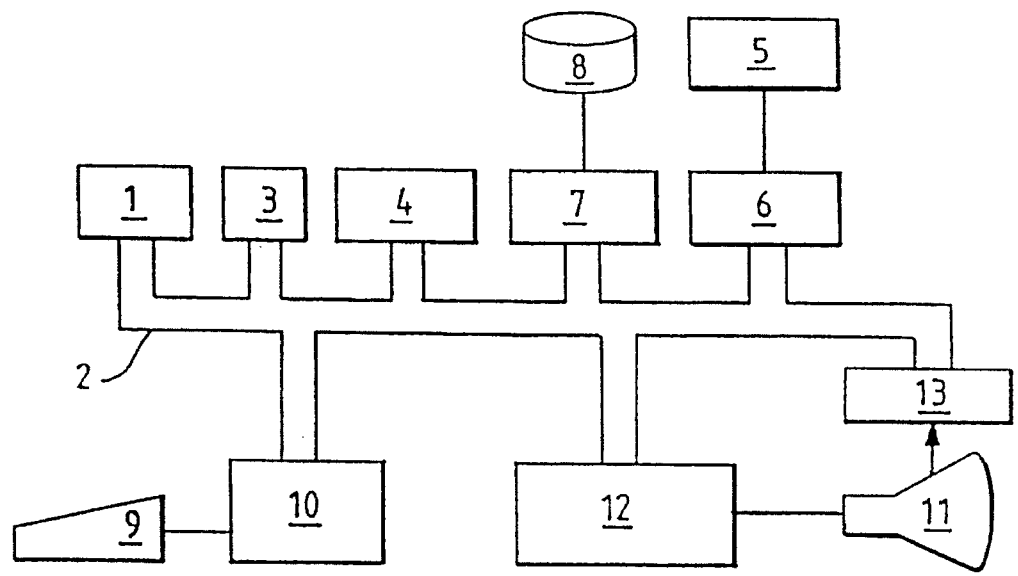
FIG. 1 is a block diagram of an example computer system including a touch-input display such as may be produced according to an embodiment of the present invention.

An example of a computer system including a touch-input display is shown schematically in FIG. 1. The computer system includes a central processing unit (CPU) 1 for executing program instructions. A bus architecture 2 provides a data communication path between the CPU and other components of the computer system. A read only memory 3 provides secure storage of data. A fast random access memory 4 provides temporary storage of data. Data communication with a host computer system 5 is provided by a communication adapter 6. An input/output adapter 7 provides a means for communicating data both to and from a mass storage device 8.

A user operates the computer system using a keyboard 9 which is connected to the bus architecture via a keyboard adapter 10. A touch-input enabled display unit 11 of the present invention provides a visual output from the computer system. The visual output is generated by a display adapter 12. The user can also operate the computer system by applying touch stimulus to a touch-sensitive input screen on the display unit. A touch-input screen adapter 13 connects signals from the touch-input screen to the bus architecture of the computer system.

Figure 2:
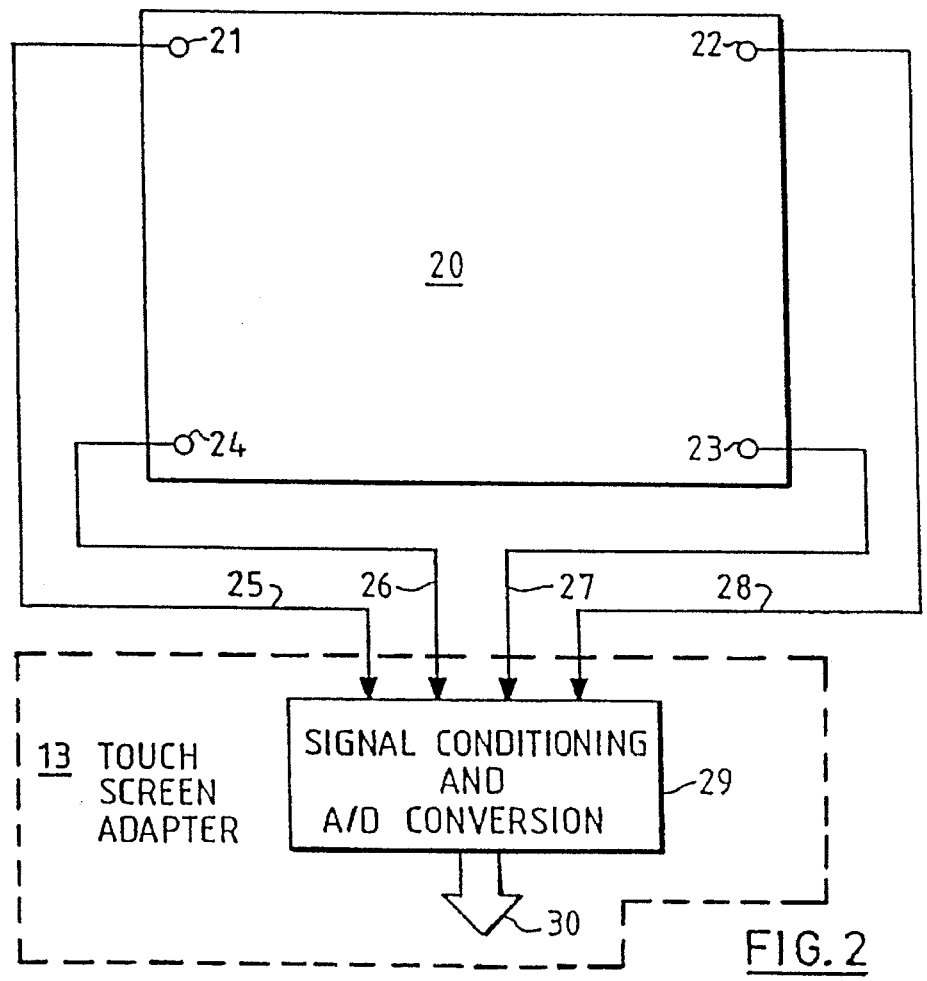
FIG. 2 is a schematic representation of a transducer arrangement which may be used to produce a touch-input display implementing the present invention.

Referring now to FIG. 2, the touch-input screen has four force-sensitive transducers 21,22,23,24 bonded proximate the four corners of a substantially rectangular, transparent touch-plate 20. Four discrete electrical signals 25,26,27,28 are generated by the four transducers, each signal being produced by a separate transducer. The four electrical signals are processed by a signal conditioning and analogue to digital (A to D) converter portion 29 of the touch-input screen adapter 13. The signal conditioning and A to D conversion portion 29 then produces a binary data output 30 indicative of relative forces measured by the four transducers. The binary data output is therefore representative of a location on the display at which a touch stimulus is applied.

Figure 3:
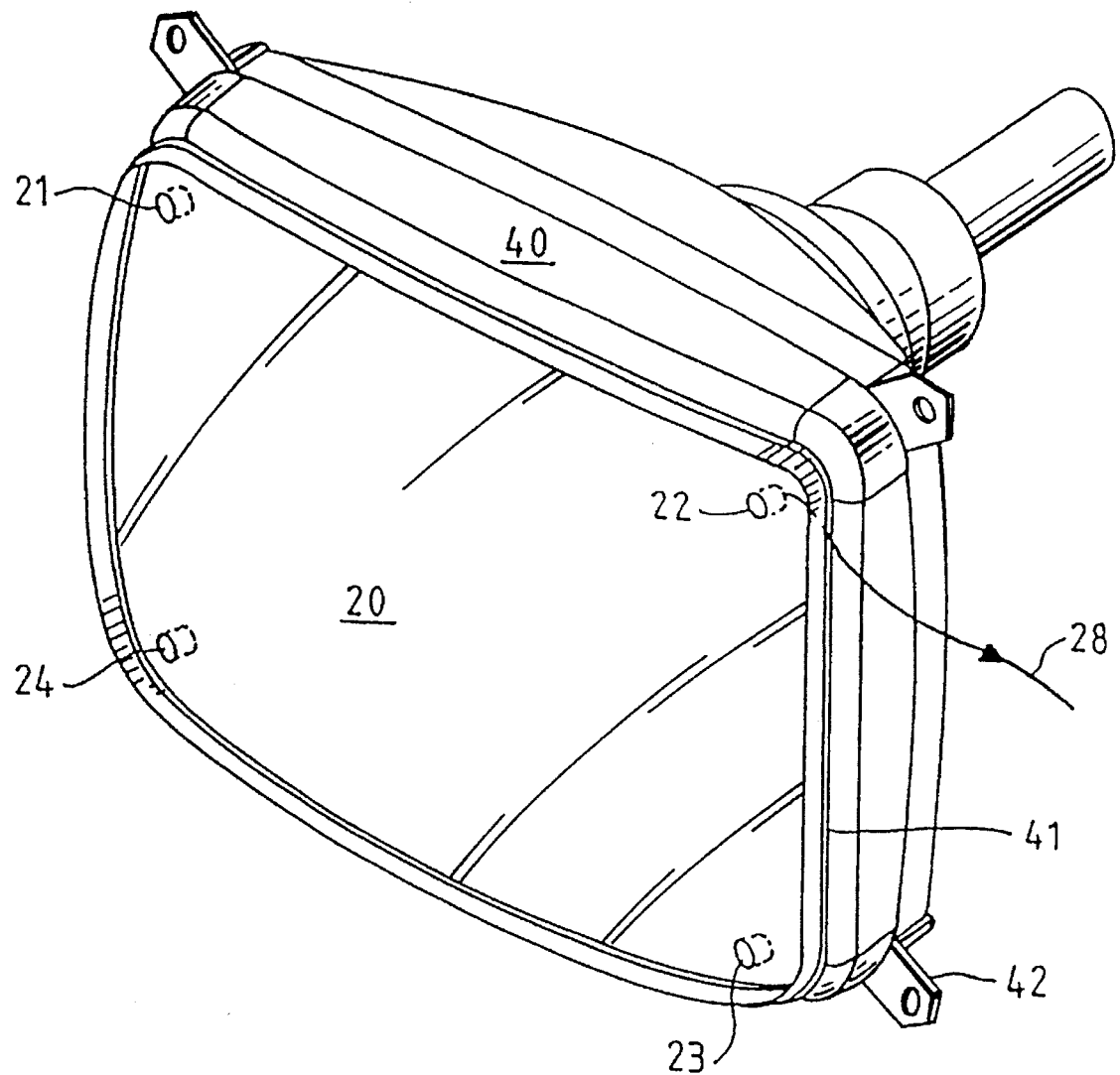
FIG. 3 is a perspective view of a CRT assembly to which a touch-plate has been bonded according to an implementation of the present invention.
Figure 4:
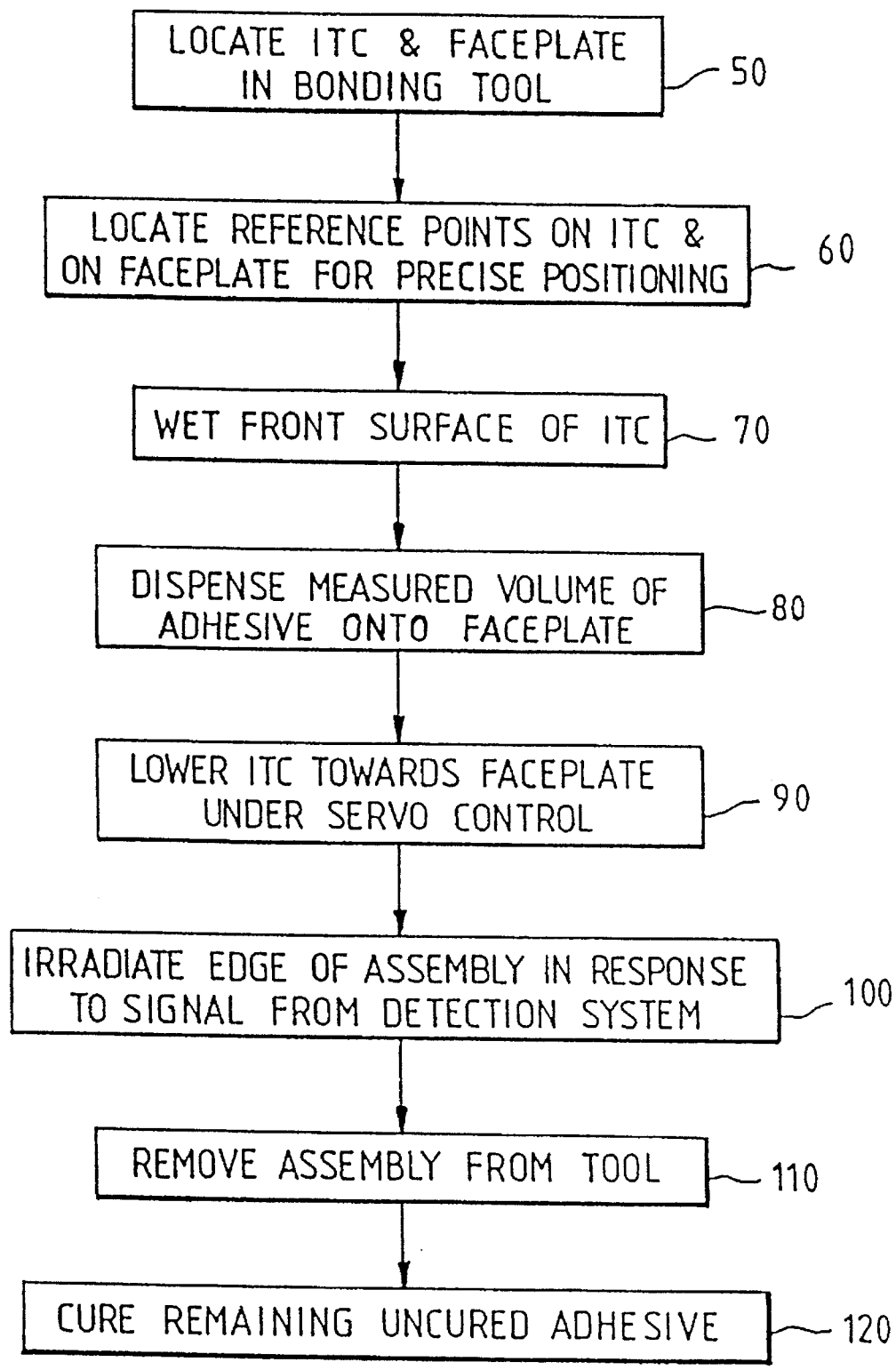
FIG. 4 is a flow diagram of the sequence of steps performed in the attachment of a faceplate to a visual display unit according to a preferred embodiment of the present invention.

Referring now to FIGS. 3 and 4, a touch-input enabled display unit has a touch-plate 20 bonded to the face of a CRT 40 by a uniform layer or film 41 of a transparent, adhesive, elastic compound. A transducer array is mounted on the touch-plate 20, as indicated in FIG. 3 by transducers 21,22, 23,24 which produce respective electrical signals 25,28,27, 26.

Figure 5:
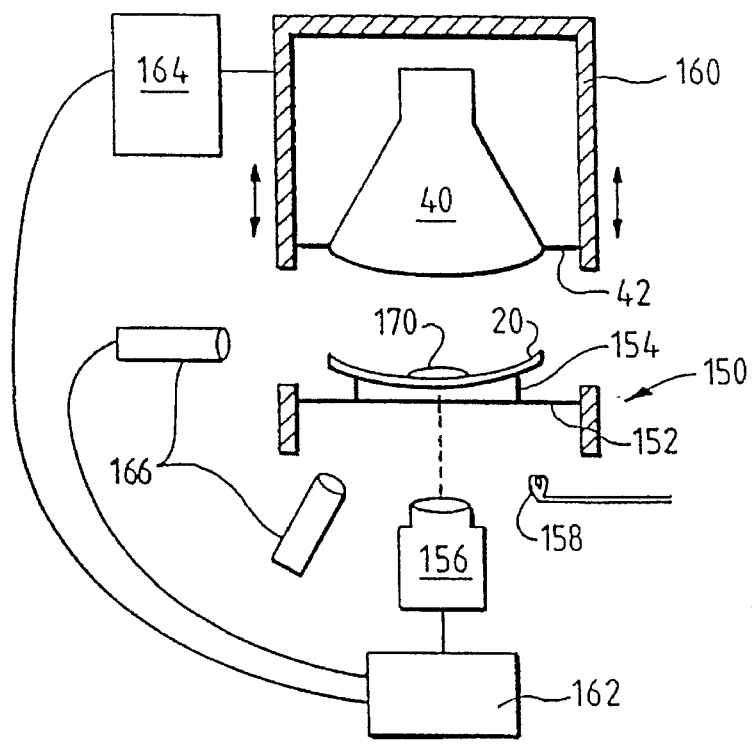
FIG. 5 shows the arrangements of the various components of a bonding apparatus according to an embodiment of the invention.
Figure 6:
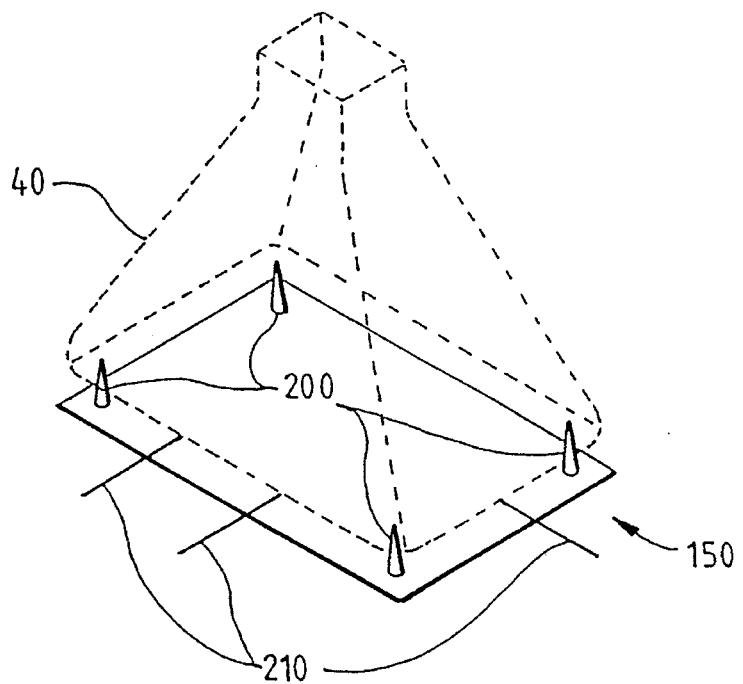
FIG. 6 shows the arrangement of position-measurement devices for a CRT, which form part of the tooling for faceplate bonding according to an embodiment of the invention.

In an automated method of touch-input enabled display manufacture (as represented in FIG. 4 as a sequence of process steps; the apparatus used in the process being shown schematically in FIGS. 5 and 6), a faceplate 20 and an integrated tube component (ITC) 40 are each located 50 in a respective support tool 150,160 for bonding together. The first tool is a location plate 152 for the faceplate, which supports the faceplate in a horizontal position with its concave face upwards, by means of positioning pins 154. The second tool carries the ITC via lugs 42. The lugs are not located in very precise positions (their positions may typically vary by 2 mm in a direction perpendicular to the plane of the display). Specific reference points for automatic positioning are therefore located 60 on each of the faceplate and the ITC surface. Glass surfaces such as CRT screens are conventionally specified by four reference points often referred to as the Z points. They are typically near the screen edge along the diagonals, and locate the surface in space. For one implementation of the reference point location, four location probes 200 for the ITC and four (in the form of the support pins 154) for the faceplate are set at the known Z point positions. The probes 200 for the ITC, which are spring loaded, are brought into contact with the ITC surface to allow the vertical positions of the reference points to be determined, for example by a computer, by connecting the probes for example to a linear potentiometer. Optical sensors could be used as an alternative to the potentiometer connection.

The measurement of the ITC Z point positions uses three horizontally positioned location pins 210 in addition to the aforementioned probes. The edges of the CRT screen are pushed against the pins to determine the location—two pins against one edge and one against a second perpendicular edge. The arrangement of these measurement devices is shown schematically in FIG. 6 (with the position of the CRT during location measurement being shown by broken lines). Location information can again be stored in a computer. The position of the front surface of the ITC is then precisely known, in three dimensions. The initial position of the faceplate in its positioning tool is determined by its support pins 154. The positioning of these pins, which are small enough not to obscure electromagnetic radiation transmitted from beneath the faceplate, is then further controlled (motor driven) to allow alignment with the plane of the CRT screen after its Z point measurement, without the need for physical spacers to be positioned between the surfaces. The faceplate support tool also uses three horizontally positioned location pins to fully determine its position. The distance between the faceplate and the CRT screen is now known.

Whilst the embodiment of the invention described above uses three dimensional positioning measurement for both the faceplate and the CRT, and then adjusts the position of the faceplate to provide correct alignment, alternative embodiments could equally provide for adjustment of the positioning of both components or of the CRT only.

The front surface of the ITC is then wetted 70 with a dilute solution of the adhesive material in a solvent, and the solvent is allowed to evaporate. This guarantees that the surface of the ITC, which will generally be textured so as to reduce reflections therefrom, is completely penetrated by adhesive and no air bubbles are entrapped. If the wetting characteristics and viscosity of the base are optimised, this additional wetting step is not required.

A measured volume of outgassed epoxy or acrylic resin is dispensed 80 onto the centre of the faceplate. A UV-curable adhesive which may be used is CIBA Araldite 4001 VV or Loctite 350 (Loctite is a trademark of Loctite Corporation). Other adhesive materials could be used as alternatives. The resin compound (or other adhesive material) desirably has a similar refractive index to the two layers which it bonds together, but the refractive index of the textured coating on the ITC front surface is generally different from that of the polished rear surface of the faceplate. Minimising reflections from each of the glass-adhesive interfaces thus requires the adhesive material to have a refractive index which is either a compromise between these two glass surfaces or is not constant. The acrylic or epoxy resin may be selected to chemically soften and swell the silica/polymer textured coating which is known to be provided on a CRT screen to reduce surface reflections. This chemical change has the effect of producing a gradual rather than an abrupt change in refractive index at the interface and thus further minimises reflections.

The ITC is then lowered 90 at a controlled rate towards the faceplate, under the control of servo-control signals from a movement controller 164. As the rate of lowering is increased, so is the tendency to entrap air behind the advancing adhesive-to-air interface. Thus, the rate of lowering is maintained at a rate which will avoid the entrapment. The lowering speed may be automatically controlled in response to signals from a visual detection system, which uses a television system 156,158 (described in more detail below). In an alternative embodiment, the ITC is manually lowered into position. As this lowering operation is continued, the approaching surfaces of the ITC and the faceplate force the resin 170 to spread out laterally from the centre to the edges of the plate, filling the gap between the ITC and the faceplate.

As the resin is forced to spread across the opposed surfaces towards the edge of the faceplate, its position is detected by a visual detection system. The detection system may comprise a television camera 156 which views the faceplate through the support plate 152 of the support tool 150. The underside of the faceplate is illuminated by visible light from a light source 158, and the camera captures images which are then sent to a capture frame store in a computer 162. Signal processing is performed to identify the position and speed of the air-to-resin interface at different times using identification of changes of refractive index. Typically, contrast and edge enhancement techniques common in optical signal processing will be used. One suitable visual detection system is the Synoptics Synapse system with the Semper 6Plus imaging language (Synoptics and SEMPER are trademarks of Synoptics Limited).

Such a detection system, and an alternative detection system, which is suitable for use in detecting the resin meniscus position for refractive-index-matched resin, are described in detail below.

As the resin reaches the edge of the faceplate, a signal is transmitted from the detection system to a UV curing apparatus 166. This signal actuates irradiation (100) of the edge of the assembly with ultraviolet electromagnetic radiation, by controlling shutters in front of the UV light sources, to cure the resin at the periphery of the faceplate and thereby to permanently bond the faceplate to the ITC. The faceplate support tool must be optically clear to UV radiation. UV radiation sources are commonly used in industrial processes, and for this application can be selected to optimise wavelength to the particular resin actuator. Such a source of radiation is the Loctite UVAloc 1000. The signal actuating the irradiation apparatus may be generated at the instant that the advancing resin interface reaches the edge of the faceplate at any position (and then progressive selective curing and ITC lowering may be performed simultaneously until the resin has reached all points around the periphery of the faceplate). Alternative methods of curing at the periphery of the faceplate include use of a thermo-setting resin and the application of heat (e.g. by thermal radiation or conductive heating).

The (vertical) gap between the faceplate and the ITC may be predetermined by the known Z point measurement, but preferably the visual detector determines when the resin has reached all points of the periphery of the faceplate and then the lowering is automatically stopped. Thus, the reference points on the faceplate and on the ITC are used to set the horizontal alignment and the visual sensor is used to determine the end point of the ITC's lowering movement. The vertical gap is thus adapted to any mechanical tolerance variations of the faceplate or the ITC screen, and there is no need for physical spacers.

The assembly is then removed 110 from the tool. The remaining uncured resin, if any, is then cured 120 by additional ultraviolet electromagnetic radiation through the faceplate. Alternatively, the remaining uncured resin is cured by infrared lamps or conduction heating.

A method of attachment of a faceplate to a ITC screen of a CRT monitor for the manufacture of a touch-sensitive display has now been described by way of an example implementation of the present invention. It will however be appreciated that the invention is also applicable to the attachment of other faceplates such as anti-reflective screens, and that the invention may use a different display device such as a liquid crystal display panel or a gas plasma panel. Additionally, the method of the invention has been described as a stage in the production of a display unit but could equally be performed as a method of retrofitting touch panels to assembled monitors. In each of these methods, touch-input enabled display units can be produced using standard manufacturing processes developed for non-touch-input displays, with the additional step of attachment of a touch-plate and sensors. Retrofit is not the preferred method of attachment in view of difficulties in performing such an operation without damaging the monitor.

An alternative to the rapid curing of the adhesive material at the edges of the faceplate is to use physical containment of the adhesive material. In one such process, an elastic gasket is automatically positioned on the upper surface of the faceplate. The gasket is of such a thickness that it forms a seal between the CRT and the faceplate before the advancing adhesive interface reaches it. The gasket has a plurality of holes pierced through it, at the positions (proximate the corners of the faceplate) which are the last to be reached by the adhesive material as it is forced to spread outwardly between the opposed surfaces, to allow escape of air. The holes are manually or automatically plugged once reached by the advancing adhesive. The aspects of the present invention of using automatic detection of the onset of the condition of gas entrapment and of the adhesive reaching the edge of the assembly (and automatic control in response to the detection) are equally applicable to a method which uses physical containment of the adhesive as an alternative to rapid selective cure.

It should also be noted that the selective curing aspects of the invention are applicable to manual as well as automated attachment processes.

As discussed earlier, a digital image capture and processing system may be used to track the travel of the resin and to identify process anomalies such as bubbles or debris that may accidentally gain entry to the dispensed resin. This computer controlled technique is sensitive enough to observe the resin accurately, determine its location, and digitally communicate the results to an automated controller. However, the measurement is highly sensitive to the illumination conditions, and so only certain illumination configurations are suitable to the implementation of a vision system in a practical manufacturing environment.

Experimentation showed that some form of active illumination must be used to allow the vision system to be employed successfully.

From the experimentation, it was observed that the most important component of the ambient light required to enhance the meniscus location was that from the side of the ITC fixture. It is believed that light is guided towards the meniscus by total internal reflection from the ITC and touchplate surfaces. At the meniscus this light is reflected, hence the observation of lower intensity inside the meniscus and a high measurement outside. Therefore the introduction of active side lighting is the optimum solution, maximising detection efficiency. The following are examples of how active side lighting could be applied. Firstly, baffled light tubes can be positioned to direct light at an angle near the edge of the faceplate. If edge seals are present and only corner gaps are available to project light through, projector bulbs with reflectors could be positioned to direct light into the corner gaps. The light could be directed so as to reflect along the glass by internal reflection and so diffuse towards the meniscus edge.

The digital vision system used for detection of light reflected from the resin interface is now described. Semper 6 Plus software was used in conjunction with a Synapse framestore. Semper 6 Plus software from Synoptics is a general purpose image processing language. It gives a complete toolkit of image processing functions that include the following:

1. Image processing, display and control.
2. Image analysis and transformations.
3. Geometric and arithmetic operations on images.
4. Image file management.
5. Framegrab—takes images from a camera or microscope.
6. Stores one or more image frames in memory.
7. Sends a frame to a television monitor to display an image.
8. Allows customised, automated processing of images.

A perpendicular line from the centre of the meniscus to a corner of the touch screen was set so that the images could be analysed along the same radial direction. For each acquired image a small area was marked and then processed to calculate the average pixel intensity over that area as well as the standard deviation of pixel intensities. This was repeated along the pre-determined line. The values for mean area intensity and standard deviation can then be graphed against radial displacement. Initial experiments highlighted the need to vary the size of the sample area to optimise the signal to noise ratio for the pixel intensities and the lateral resolution. From the results obtained the optimum sample area was chosen as 1.25×1.25 mmsq. (5×5 pixels).

METHOD 1: SINGLE IMAGE-MULTIPLE SAMPLE AREA ANALYSIS

A set of images were acquired with the meniscus at different radial positions. Each image was analysed using the same method. This invovled locating the intersection of the sampling line and the meniscus, then taking ten samples either side of this point along the sampling line. A plot of mean area intensity versus radial displacement was constructed. The standard deviation of the pixel intensities in the sample area was also graphed against radial displacement. Both these measurements gave witness to the location of the meniscus on each image. A very distinct peak was found for standard deviation verses radial displacement at approximately 20 mm of radial displacement. This peak identified the exact location of the resin meniscus.

METHOD 2: MULTIPLE IMAGE-FIXED SAMPLE AREA ANALYSIS

For this analysis a sampling position was located and fixed. Measurements of the mean pixel intensity and standard deviation were then taken from this area for a set of images captured as the meniscus moved through this point to determine the feasibility of using intensity and standard deviation as flags for meniscus monitoring at the faceplate edge.

Image obtained during experimentation were analysed to produce a graph. In particular, image toward the end of the process (ie. the edge of the faceplate) must be analysed for it to be effective. 2 indicators can be used to detect when the resin meniscus has reached the fixed sampling point: the means pixel intensity change and the standard deviation.

Multiple Image Fixed Sample Area Analysis sis merited to be the better of the described image analysis techniques as the changes in pixel intensity and standard deviation are more distinctive. With the vision system a variety of fixed sampling areas can be monitored to further improve the meniscus tracking. Additionally, it is necessary to check for a defect free bond and in all other bonding processes this check is done by human visual inspection, which is always time consuming and costly. The vision system is therefore used, increasing the automation of the process. At the point where the ITC panel and resin first meet as the panel is being lowered air bubbles can be created. The vision system was given the task of detecting the presence of bubble formation or debris so that the process can be stopped and the ITC and touchscreen salvaged.

Figure 7:
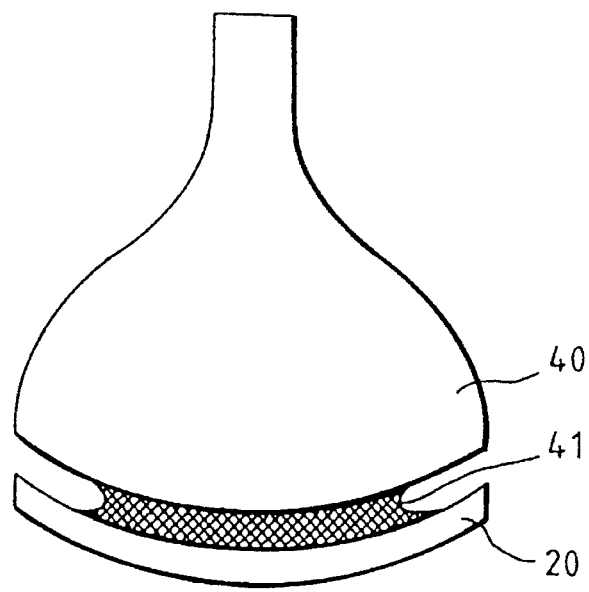
FIG. 7 shows resin dispersement between a faceplate and CRT according to an embodiment of the invention.

A method and system for detecting the position of the air-to-resin interface as liquid resin is squeezed between the opposing surfaces of an ITC screen and a faceplate was described earlier. An alternative automatic detection system will now be described. FIG. 7 shows a faceplate 20 held beneath a CRT 40 with a small separation gap, in the process of bringing the surfaces of the CRT and faceplate together after resin 41 has been dispensed onto one of the surfaces. The detection system now to be described is equally applicable to methods of faceplate bonding in which the relative positions of the faceplate and CRT are set and then the gap between them is subsequently filled with resin. In order to determine when to initiate certain actions in the bonding process (e.g. initiating edge sealing), it is necessary to be able to sense the position of the resin meniscus or at least to detect when the liquid resin reaches key points over the surface of the faceplate. This is implemented by arranging for detection at one point near each edge and also near each corner—eight sensing positions in total.

Figure 8A:
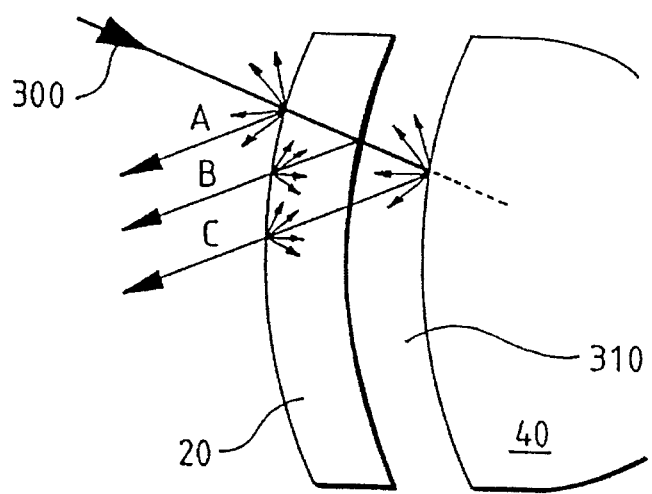
FIGS. 8a–8b show paths of a beam of light impinging of a faceplate separated from a CRT by an air gap and resin, respectively, according to an embodiment of the invention.
Figure 8B:
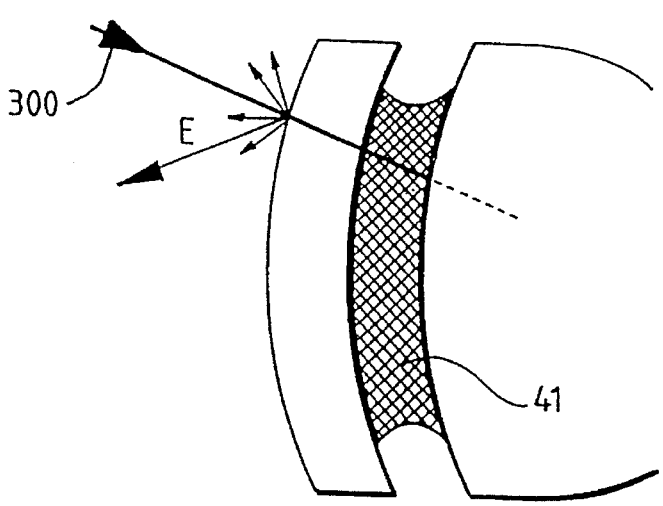

FIGS. 8a and 8b give simplified representations of what happens when a beam of light 300 is focused onto the surfaces, firstly with an air gap 310 between the faceplate and the CRT in FIG. 8a, and secondly with a refractive index matched resin 41 filling the gap in FIG. 8b.

With reference to FIG. 8a, an incoming beam of light strikes the faceplate and approximately 4% of this light is reflected because of the difference in refractive index between air and glass. Since the faceplate surface is slightly roughened, the reflected light is partly specular and partly diffuse. The ratio of specular to diffuse reflected light is approximately one to one for commonly used faceplate materials, and therefore 2% of the collimated light continues as collimated beam A. 96% of the light goes through the faceplate and strikes its rear surface where 4% is reflected. This 4% strikes the front (roughened) surface and 2% emerges as collimated beam B. 96% of the light at the rear faceplate surface emerges and continues until it strikes the roughened CRT surface, where we get reflection in the same way as before. The reflected light again passes through the roughened faceplate surface to emerge as collimated beam C.

The total collimated light that can be collected is A+B+C, and is approximately:

$$\begin{array}{ccc} A & + & B & + \\ 0.04 \times 0.5 & + & 0.96 \times 0.04 \times 0.5 & + & 0.96 \times \end{array}$$

$$\begin{array}{c} C \\ 0.96 \times 0.04 \times 0.5 \times 0.5 = 0.0484 \end{array}$$

In the resin filled case of FIG. 8b, light is reflected from the front surface as before, but both the rear faceplate surface and the CRT front surface are now covered with index matched liquid so that no significant reflection takes place.

Thus light beam E has magnitude: 0.04×0.5=0.02

The change ratio in the light that can be detected as the meniscus moves through the path of the light beam ban be seen to be:

0.0484/0.02=2.4

In practice, it is also possible to detect disturbances as the curved meniscus passes the light beam, with various reflecting angles and rapid changes in these, depending on the size of the light beam relative to the gap width, and the angle of the light beam. Typically the touchplate thickness will be 2 mm and the gap width 1 to 2 mm.

The light which enters the CRT glass screen will not produce significant further reflections, since it will be double attenuated by the CRT's 50% neutral density filtering, as is known in the art.

Figure 9:
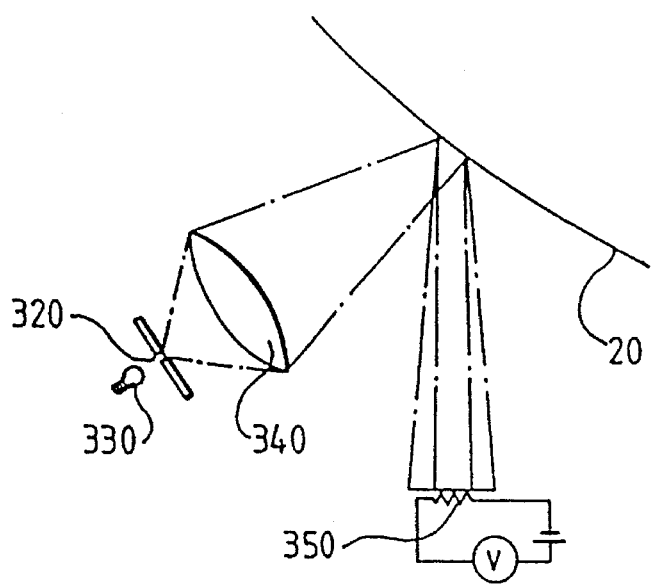
FIG. 9 is a diagrammatic representation of a resin surface detection system according to an embodiment of the invention.

FIG. 9 is a diagrammatic representation of a system developed for resin surface detection. A 0.3 mm pinhole 320 was positioned close to a halogen lamp 330, and the light collected with a 35 mm focal length lens 340. This focused light passing through the pinhole onto the surface of the faceplate 20 positioned 185 mm away. A light dependent resistor 350 of diameter 3 mm was placed 250 mm away from the plate, with a half angle of 26 degrees.

Because the light is focused onto the plate surface, the reflected light will diverge, and from a flat plate the 1 mm spot will increase to 2 cm diameter. However, the faceplate is actually curved (eg radius 580 mm on a 14" CRT, and 1200 mm on a 15" FST), and therefore the light beam diverges, even more, to 4 cm as measured.

These two cases are shown as the different diameter reflected beams in FIG. 9.

Figure 10:
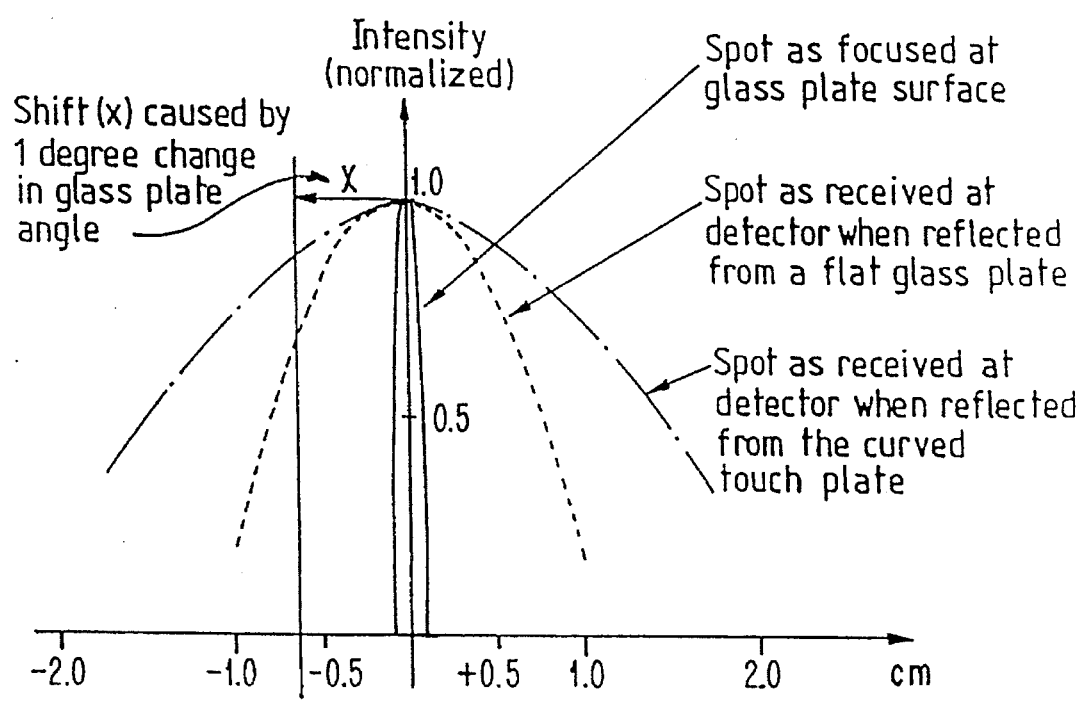
FIG. 10 is a graph showing a profile of light measured by the detector shown in FIG. 9 relative to the light profile on the faceplate according to an embodiment of the invention.

In FIG. 10 is shown the results of measuring the spot profiles at the detector, relative to the spot profile on the plate surface. A further problem is to counter the effect of tolerances in plate angle and curvature (eg as shown in FIG. 11), so that light could always be guaranteed to strike the detector. Shown on FIG. 10 is the shift (x) that occurs if the plate angle changes by one degree. In the case of a flat plate (eg the vertical axis of a Sony Trinitron or Mitsubishi Diamondtron CRT), or in the case where a smaller spot was used (e.g. where the source of illumination was a laser) or where tolerances exceeded one degree, it can be seen that light beam/detector coincidence might become marginal. The effect of an angular position error of the faceplate is represented schematically in FIG. 11.

FIG. 12 shows a solution to the tolerance problem. Here, an array 360 of sensors (350, 350', 350") is used, the particular implementation being a rectangular 3×3 array of low cost light-sensitive resistors or photodiodes. With this arrangement one sensor in the array will always be substantially illuminated, irrespective of the angular tolerance of the plate.

It is then necessary to determine which sensor to use in the detection (simply placing all sensors in series or parallel would reduce sensitivity), and a method of doing this is shown in FIG. 13. The sensors are taken to a 9 channel electronic switch 370 and the first sensor 350 in the array is selected and its output stored in a sample and hold circuit 380. The next sensor 350' is now selected and compared to the previous value in the sample and hold circuit. Depending on which is larger, the sample and hold is either left unchanged or is updated by the new sensor. The sensor number will be stored. Cycling is carried out to find the number of the sensor with the largest output, and this will be the sensor used. This selection process is performed as each new faceplate is placed in position. The switch output is passed to an A/D input on a computer, and the process is then controlled by computer.

The detection results shown in FIG. 14 were produced using the simple and low cost system described above. The graph shows the change in resistance of the light sensor as the liquid interface passes through the light beam, for different spot diameters and angles of incident light. Best results were obtained with a small spot diameter of 1 mm and a light beam angle of 26 degrees to the touchplate. An enhanced resistance peak was detected as the meniscus passed through the beam. The narrow collimated beam from a laser diode could produce further improvements to detection ratios. The light detector was found to work satisfactorily in low ambient light if appropriate shielding is used for the detector element.

Described earlier are methods of selective curing of resin around the edges of a faceplate, and alternatives to selective curing that employ physical containment of resin. We will now describe implementation of such physical containment methods in more detail, describing a first implementation using flexible and movable seals, and a second implementation using an "air knife" containment. These containment methods involve the following common sequence of steps:

1. bringing the opposed surfaces of the faceplate and VDU together until the adhesive material has been displaced sufficiently towards the outer edges of the surfaces for it to be detected, by a detection means arranged to detect the adhesive material, at a position proximate an outer edge of the opposed surfaces;

2. responsive to detection by the detection means of the adhesive material at a position proximate one of the outer edges, actuating a containment mechanism to prevent leakage of the adhesive material from the outer edges;

3. bringing the opposed surfaces closer together until the adhesive material has been displaced sufficiently for it to be detected at a position proximate one of the four corners of the opposed surfaces;

4. responsive to detection by a detection means of the adhesive material at a position proximate one of said corners, actuating a curing mechanism to cure only the adhesive material which is proximate said one corner;

5. bringing the opposed surfaces together and actuating a curing mechanism to cure the adhesive material proximate each of the remaining corners of said surfaces in turn, in response to detection of the adhesive material at respective positions proximate each corner; and 6. curing the remaining adhesive material subsequent to the adhesive material reaching all of said corners.

Methods of bonding have been described in which liquid resin is dispensed onto the centre of a surface of a faceplate, and the ITC is then lowered towards the faceplate resulting in displacement of the resin. As the resin reaches the edges of the faceplate it is necessary to provide a seal and, since the resin will progressively advance along the edges until it reaches the corners of the faceplate, the seal must also accommodate this. The resin is cured to permanently bond the faceplate to the ITC screen. The three stages of this overall process are represented in FIGS. 15a, 15b and 15c respectively, with physical containment seals 400 being shown in each of FIGS. 15b and 15c. Ultraviolet irradiation of the structure for curing purposes is represented in FIG. 15c by arrows 410.

The seals are typically formed of resilient silicone, moulded to conform to the ITC and touchplate profile. These seals are pressed against each of the four edges of the faceplate and ITC screen, but with each corner left open to allow air to be expelled. Typical silicone moulding materials are sufficiently flexible to permit the few millimeters (at most) of movement of the ITC towards the faceplate after the seals are brought into position (i.e. the movement between the stages represented by FIGS. 15b and 15c).

The aforementioned resin meniscus edge sensors are positioned at each of the four corners to detect when the resin reaches that point. Then a UV light is turned on (or a shutter opened), collimated just to irradiate that corner. By choice of the light power, the setting time can be controlled, and a relatively low power is used so that a thin skin only is formed during the available few seconds before all corners are reached. This thin skin seals the corner and prevents resin escaping, but does not prevent the fraction of a millimeter movement of ITC to touchplate that occurs subsequent to its formation.

The total sequence of events is:

1. Begin the resin displacement operation.
2. Determine when resin gets to within 2 cm of any edge using a light detector or a vision system.
3. Halt resin displacement by stopping the descent of the ITC.
4. Bring in the edge seals with a slight pressure (a pressure equivalent to finger pressure is generally acceptable).
5. Continue resin displacement.
6. Detect when resin reaches each corner and illuminate just the corner with low power UV light (as shown in FIG. 16).
7. When the last corner is reached, stop resin displacement.
8. Turn on high power UV lights to irradiate the whole front surface of the ITC/faceplate, and so permanently cure the resin.

At a distance from the edge of 2 cm, the remaining vertical distance for the ITC to be lowered is approximately 2.5 mm, and the seals are sufficiently flexible to accommodate this. The most suitable seals are formed of very flexible Silicone rubber with a built in release agent that avoids the need to separately coat the seals, as is known in the art.

FIG. 16 shows the physical arrangement of silicone rubber edge seals 400 in contact with the edges of a faceplate 20. Four collimated low-level UV light sources 116 are positioned proximate the corners of the faceplate for irradiating the resin when it is detected by the respective sensor for that corner position.

The method described above also works with cylindrical ITCs such as the Sony Trinitron or Mitsubishi Diamondtron, except that seals are put into place immediately on two of the edges to act as a barrier to the dispensed resin.

A further alternative to the above-described use of flexible seals for the containment of resin during faceplate positioning will now be described. Mechanical seals are avoided by use of an air barrier to seal the edges of the assembly while the resin is mobile. The air barrier accommodates the progressive advance of the resin along the faceplate edges until it reaches the corners. FIG. 17 shows a fan 420 having a profiled nozzle attached thereto, which is arranged to direct air onto the resin interface 41 between the ITC 40 and faceplate 20.

As the adhesive moves to the edge of the faceplate, air pressure is used to halt and maintain the advancing adhesive, providing an air barrier or "control knife" that achieves and maintains the required deformation of the resin meniscus to prevent resin leakage. As the adhesive proceeds to fill the gap between the surfaces up to the corner any interfacial air escapes through the open corners whilst the air barrier confines the adhesive within the faceplate boundary.

A static air barrier implementation was observed to require progressive movement along the edge of the interface as the resin moved outwards to the corners of the faceplate. The static system is improved upon by using a resin detection or vision system to provide observational feedback with which the operation parameters of the air barrier can be controlled. These parameters include the shape of the nozzle, the position of the fan/nozzle, and the power of the air barrier. This dynamic system supports a repeatable and automated dispensing and containment of the adhesive between the ITC and faceplate. The air must be dust free to prevent contamination of the resin optical bond, and so a filter 425 is incorporated in the fan. The air flow is kept sufficiently stable to minimize flow or stress during the curing phase.

With this method of resin dispensing and containment there is the problem of tolerance errors on the faceplate radius and the repeatability of the geometrical alignment of individual CRTs and faceplates. As a result, the adhesive resin cannot be guaranteed to simultaneously reach the 4 corners at the same time, hence a means of sealing the individual corners is required to make this method of sealing practical. The same curing arrangement described previously for flexible physical containment seals is used, with resin meniscus edge sensors positioned at each of the four corners. A UV light is turned on, collimated just to irradiate that corner, forming a thin skin during the available few seconds before all corners are reached. Following this, higher power UV lights are used to irradiate the whole front surface of the assembly to permanently cure the resin.

The advantage of the described methods maintaining the resin in a liquid state until the final cure inhibits stress growth as compared with the methods of bonding in which selective resin curing is carried out around the whole edge of the faceplate as a first step followed by a subsequent step of curing the remaining resin. Implementations which use an air barrier prevent resin overflow without mechanical sealing, thereby minimising the amount of disassembly required after bonding and hence reducing both the time required for the total manufacturing process and the likelihood of damaging the assemblies. The absence of physical barriers aids stress free curing.

An optimisation for automated implementations of the panel bonding process involves measurement of each faceplate prior to bonding and control of the amount of resin material used for bonding in dependence on this measurement. In automated volume production processes, the cost of materials can be the predominant manufacturing cost for a monitor and the cost of resin used for faceplate bonding can be a significant element of that material cost. Clearly the volume of resin that is required for each monitor is dependent on the separation distance between the faceplate and the ITC screen, and so a saving in cost is achieved by a minimisation of the separation distance and identification of the minimum volume of resin needed to fill the gap. A problem arises when seeking to minimize the volume of resin used, due to the variations between the physical dimensions of individual faceplates—as with any manufacturing process, the manufacture of faceplates produces faceplates with dimensions (notably the radius of curvature) that vary within tolerance limits. The variations between individual CRT screens will generally be much smaller than those between faceplates, in view of the high precision processes used in CRT production. If the same fixed volume of resin is to be used for each CRT-touchplate combination, then the volume must be sufficient to cope with the worst case tolerance situation or incomplete filling of the gap could result.

The solution to the above problem of how to minimise resin usage is to optimise the volume used for each faceplate in turn. This is implemented by measuring the radius of curvature of each faceplate prior to bonding. The output of this measurement is passed to a control computer and used to calculate a deviation from the nominal radius. The optimum volume of resin is then determined according to a volume determination function stored in the control computer's memory. The control computer is linked to the resin dispensing system to control dispensing of this calculated optimimum volume. This optimisation of resin volume use is made possible by the avoidance of dependency on fixed spacers for determining spacing between the CRT and the faceplate, which avoidance is a feature of the visual-detector-controlled automated positioning of faceplates described earlier. The measurement data for individual faceplates can also be used in the control of the faceplate production process.

FIGS. 18a and 18b show a system for implementing faceplate measurement for the calculation of resin volumes. A plurality of measurement pins 450 are fitted to the touchplate tool support plate 152 in a matrix arrangement. The measuring pins are spring loaded and connected to linear potentiometers 460 which are multiplexed to a computer 164. Other similar readout devices could equally be used. Symbol 470 in FIG. 18a represents the reference plane of the support plate. From the matrix of measurement points, the computer can estimate an area profile for the panel. FIG. 19a shows a representative example of the effect of radius variations, in this instance for a faceplate 20 having a larger radius of curvature than the CRT 40 such that the gap between them is larger adjacent their edges. The "error volume" between the CRT and the faceplate (i.e. that part of the volume spacing which results from variations from the nominal dimensions for faceplates) may be mathematically mapped onto a flat plane for reference, as represented and exemplified in FIG. 19b. The inclusion in this figure of gap dimensions for a faceplate with edge dimensions 300 mm by 220 mm are also merely exemplary. The resin volume estimation uses well known integration techniques, with a predefined minimum gap (e.g. 0.5 mm) which is to be maintained between CRT and faceplate at any point during bonding.

A graphical construction may be used as an alternative to integration. A graph of resin volume (V) against the corner spacing tolerance (d) resulting from variations in faceplate radii of curvature, again with a minimum gap of 0.5 mm at the centre, is shown in FIG. 20. While only exemplary, FIG. 20 shows that faceplate radius error can have a large effect on the required resin volume, and so the potential material savings of the volume optimisation are large unless faceplate manufacture is sufficiently precise that dimensional tolerances are very low.

The preferred embodiment of the invention thus includes the step of measuring faceplate dimensions for each faceplate and calculating from said dimensions an optimum volume of adhesive material to be dispensed onto said at least one surface for forming said adhesive layer, the step of dispensing then being controlled in dependence on said calculation.

We claim:

1. A method of attaching a transparent faceplate (20) to a screen of a visual display unit (40), by adhesion of opposed surfaces thereof, comprising the steps of:

locating reference points on the faceplate (20) and on the visual display unit for precise relative positioning of said surfaces by a positioning tool without the need for the positioning of physical spacers between said surfaces;

dispensing (80) an adhesive material onto at least one of said surfaces;

bringing said surfaces together (90) in a controlled manner using said reference points, such that the opposed surfaces displace the adhesive material outwards towards the edges of said surfaces to form an adhesive layer which fills the gap therebetween, wherein a termination point for the step of bringing said surfaces together is determined using a detection means for determining when the adhesive material has reached predefined points proximate the outer edges of the opposed surfaces;

curing (100,120) the adhesive material to secure the faceplate to the screen.

2. A method according to claim 1, including the step of measuring faceplate dimensions for each faceplate and calculating from said dimensions an optimum volume of adhesive material to be dispensed onto said at least one surface for forming said adhesive layer, the step of dispensing then being controlled in dependence on said calculation.

3. A method according to claim 1, wherein said predefined points are located proximate each of the four corners of the opposed surfaces, said detection means then effectively determining when the adhesive material has reached all points around the outer edges of the opposed surfaces.

4. A method according to claim 3, including the step of measuring faceplate dimensions for each faceplate and calculating from said dimensions an optimum volume of adhesive material to be dispensed onto said at least one surface for forming said calculation.

5. A method according to claim 1, including the step of measuring faceplate dimensions for each faceplate and calculating from said dimensions an optimum volume of adhesive material to be dispensed onto said at least one surface for forming said adhesive layer, the step of dispensing then being controlled in dependence on said calculation.

* * * * *

UNITED STATES PATENT AND TRADEMARK OFFICE
CERTIFICATE OF CORRECTION

PATENT NO.   : 5,605,595
DATED        : February 25, 1997
INVENTOR(S)  : John Beeteson, et. al.

It is certified that error appears in the above-identified patent and that said Letters Patent is hereby corrected as shown below:

Title page, item [30]  Foreign Application Priority Data

Dec. 18, 1993  [GB]  United Kingdom    9325932 should read as:

[30]  Foreign Application Priority Data

Dec. 18, 1993  [GB]  United Kingdom    9325932
Dec. 16, 1994  [GB]  United Kingdom    9425415

Signed and Sealed this

Sixteenth Day of December, 1997

Attest:

BRUCE LEHMAN

*Attesting Officer*    Commissioner of Patents and Trademarks